United States Patent

Chao

[11] Patent Number: 5,815,899
[45] Date of Patent: Oct. 6, 1998

[54] METHOD FOR MAKING A SPECTACLE FRAME

[76] Inventor: David Yinkai Chao, 1120 Green Acre Rd., Towson, Md. 21204

[21] Appl. No.: 675,210

[22] Filed: Jun. 17, 1996

[51] Int. Cl.$^6$ .................. G02C 5/14; G02C 5/22
[52] U.S. Cl. ................ 29/20; 29/436; 16/228; 351/153
[58] Field of Search .............. 29/20, 434, 436, 29/525.08, 525.09; 16/228, 334; 351/121, 153

[56] References Cited

U.S. PATENT DOCUMENTS

| 2,098,921 | 11/1937 | Mandaville | 16/228 X |
| 4,084,889 | 4/1978 | Vischer | 16/228 X |
| 4,161,060 | 7/1979 | Lenne et al. | 29/20 X |
| 4,318,879 | 3/1982 | Gartner | 29/20 X |
| 4,832,479 | 5/1989 | Beyer et al. | 16/228 X |

FOREIGN PATENT DOCUMENTS

| 399875 | 11/1990 | European Pat. Off. | 16/228 |

Primary Examiner—Daniel Moon
Attorney, Agent, or Firm—Fliesler Dubb Meyer & Lovejoy LLP

[57] ABSTRACT

A method for manufacturing a spectacle frame includes molding a frame having two extensions formed in the side portions. The extensions each has a groove for receiving a spring and a ball and each has a lateral channel intersecting the groove. A pair of legs each has one end pivotally coupled to the free end portion of the extensions by a pin for allowing the legs to be engaged with the ball. The legs are not required to be excavated. In addition, the spring members can be easily assembled in the extensions of the spectacle frame.

2 Claims, 3 Drawing Sheets

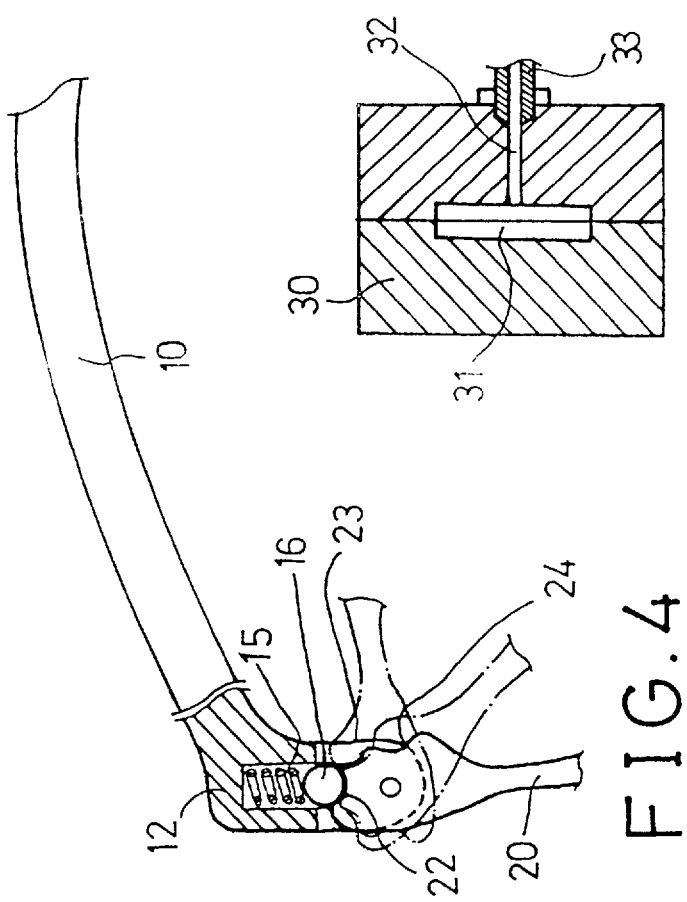
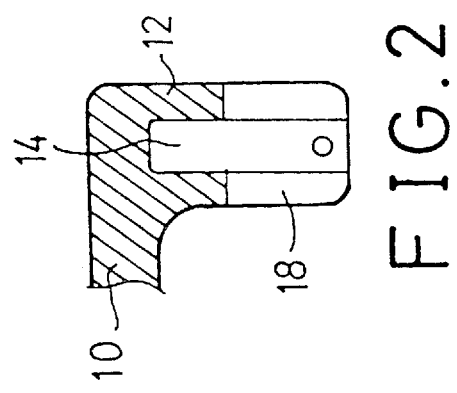
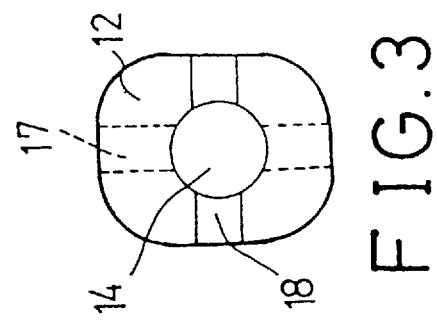

5,815,899

METHOD FOR MAKING A SPECTACLE FRAME

BACKGROUND OF THE INVENTION

1. Field of the Invention

The present invention relates to a spectacle frame, and more particularly to a method for manufacturing a spectacle frame.

2. Description of the Prior Art

Typical spectacle frames having resilient coupling are disclosed in U.S. Pat. Nos. 4,747,183 to Drlik and 5,018,242 to Guy et al. Another typical spectacle frames having resilient coupling are disclosed in U.S. Pat. Nos. 3,064,530 to Vigano and 4,456,346 to Beyer. The typical spectacle frames comprise a complicated configuration that may not be easily manufactured. For example, the extensions are required to be secured to the frame body by welding process and by hinge members. Highly skilled person is required for conducting the welding process. The legs are required to be excavated for receiving the spring and a shaft or rod therein such that the legs are greatly weakened.

The present invention has arisen to mitigate and/or obviate the afore-described disadvantages of the conventional methods for manufacturing metal spectacle frames.

SUMMARY OF THE INVENTION

The primary objective of the present invention is to provide a method for easily manufacturing and assembling the spectacle frames.

In accordance with one aspect of the invention, there is provided a method for manufacturing a spectacle frame, The method comprises preparing a mold device having a mold cavity formed therein and corresponding to a shape of the spectacle frame, injecting a material into the mold cavity so as to form the spectacle frame, the spectacle frame including a frame body, the frame body including two side portions each having an extension extended rearward therefrom, the extensions each including a groove formed therein and each including a channel laterally formed therein and intersecting the groove, the extensions each including a free end portion having a pin engaged therein, engaging a spring and a ball into groove of each of the extensions, and engaging first ends of a pair of legs to the pins respectively so as to allow the legs to be rotated about the pins respectively and so as to allow the first ends of the legs to be engaged with the balls.

The legs each includes at least two curved depressions formed in the first end for engaging with the ball and for maintaining the legs at a working position and a folded position respectively.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a cross sectional view taken along lines 2—2 of FIG. 1;

FIG. 3 is an end view of the extension of the spectacle frame;

FIG. 4 is a schematic view illustrating the coupling of the leg to the extension of the spectacle frame;

FIG. 5 is a cross sectional view of a mold device for conducting the method in accordance with the present invention.

DETAILED DESCRIPTION OF THE PREFERRED EMBODIMENT

Figure 1:
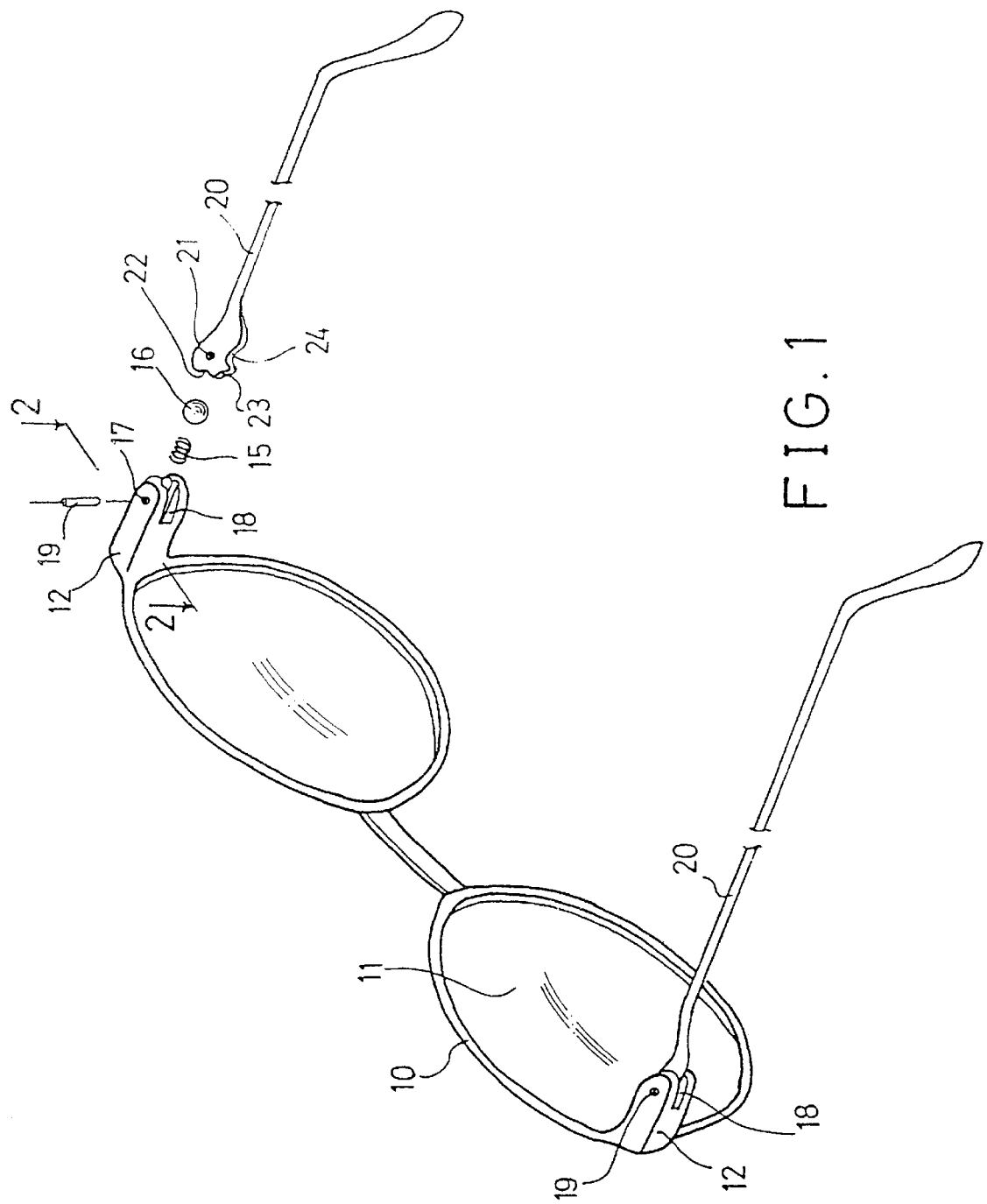
FIG. 1 is a partial exploded view of a spectacle frame to be made by a method in accordance with the present invention.

Referring to the drawings, and initially to FIGS. 1 to 4, a method in accordance with the present invention is provided for manufacturing a spectacle frame having a resilient leg coupling. The spectacle frame comprises a frame body 10 for supporting lens 11 therein. The frame body 10 includes two side portions each having an extension 12 extended rearward therefrom. The extensions 12 each includes a groove 14 formed therein for receiving a spring 15 and a ball 16 therein and each includes a channel 18 laterally formed therein and intersecting the groove 14, best shown in FIGS. 2 and 3. The extensions 12 each includes a free end portion having an orifice 17 formed therein for engaging with a pin 19. A pair of legs 20 each includes one end engaged in the channel 18 and each includes a hole 21 for engaging with the pin 19 such that the legs 20 are allowed to be rotated about the pin 19. The legs 20 each includes two or more curved depressions 22, 23, 24 formed in the end portion for engaging with the ball 16.

In operation, as shown in FIG. 4, the legs 20 may be maintained at a working position when the depressions 22 are engaged with the ball 16; and may be maintained at a folded position when the depressions 24 are engaged with the ball 16; and may be maintained at an intermediate position when the depressions 23 are engaged with the ball 16.

The characteristic of the present invention is to provide a method for manufacturing the spectacle frame as described above. In the method, a mold device 30 is used and includes a mold cavity 31 having a shape corresponding to that of the spectacle frame 10 and having an entrance 32 for engaging with an injector mouth or an injector nozzle 33 so as to inject the melted material into the mold cavity 31 and so as to form the spectacle frame 10. It is to be noted that the extensions 12 are formed integral with the spectacle frame during the molding process. The extensions 12 can be to a large size for forming the groove 14 therein. In addition, the groove 14 can also be formed in the molding process so as to allow the spectacle frame to be easily manufactured and assembled.

In assembling the spectacle frame, it is only required to engage the spring 15 and the ball 16 into the groove 14 and to engage the pin 19 through the extension 12 and the leg 20.

Figure 6:
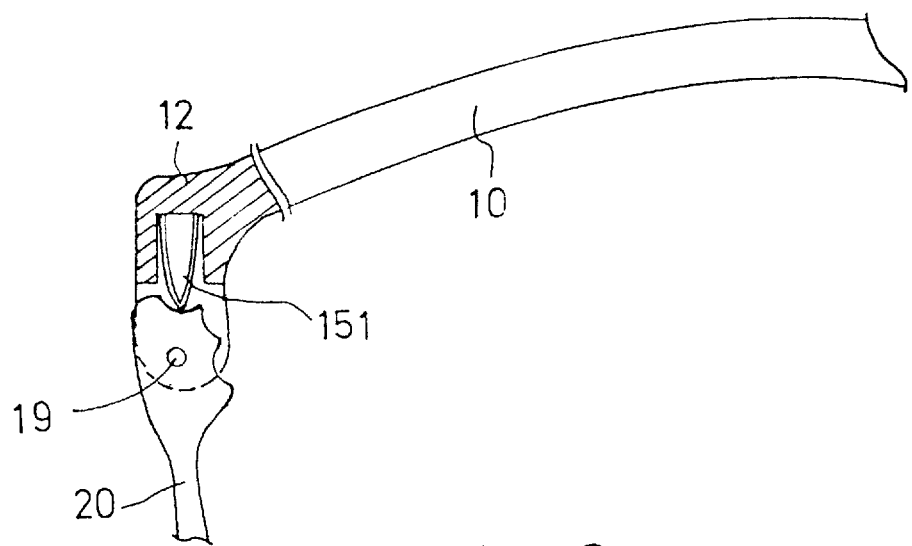
FIGS. 6 and 7 are schematic views similar to FIG. 4, illustrating the coupling of the leg to the extension of the spectacle frame.
Figure 7:
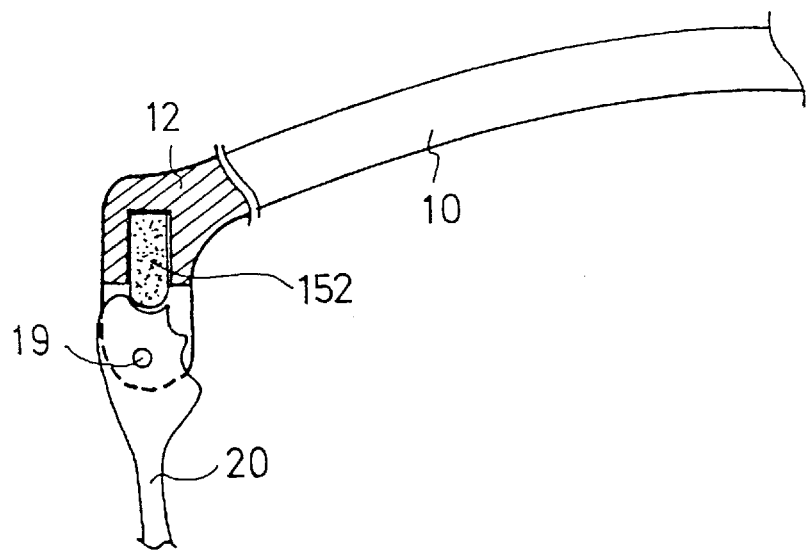

Alternatively, as shown in FIGS. 6 and 7, the spring 15 and the ball 16 can be replaced by a curved or bent resilient blade 151, or by a resilient bar 152 of rubber or other resilient materials. The resilient blade 151 and the resilient bar 152 may engage with the depressions 22 of the legs 20 so as to maintain the legs 20 at the working position and the intermediate position and the folded position respectively. The spectacle frame can also be easily assembled by engaging the resilient blade 151 or the resilient bar 152 into the groove 14 and to engage the pin 19 through the extension 12 and the leg 20.

It is to be noted that the typical spectacle frames having resilient coupling are required to engage the spring and the shaft into the end portion of the legs which are required to be excavated and which will thus be greatly weakened. In addition, the extensions are normally secured to the frame body by welding processes, such that it may take a long time for manufacturing only one typical spectacle frame. In the method of the present invention, the end portions of the legs are not required to be excavated such that the legs will not be weakened. In addition, no welding processes are required such that no skilled person is required for manufacturing the spectacle frame.

Accordingly, the method in accordance with the present invention may be used for manufacturing a spectacle frame easily and quickly and for allowing the spectacle frame to be easily manufactured and assembled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for manufacturing a spectacle frame, said method comprising:

preparing a mold device having a mold cavity formed therein and corresponding to a shape of said spectacle frame, injecting a material into said mold cavity so as to form said spectacle frame, said spectacle frame including a frame body, said frame body including two lens rims for holding a pair of lenses, and two side portions, each side portion being made of the same material as one of the lens rims, each side portion having an extension extended rearward therefrom, said extensions each including a groove formed therein that extends rearward from the corresponding side portion, and each including a channel laterally formed therein and intersecting said groove, said extensions each including a free end portion having a pin engaged therein, engaging a biasing means into said groove of each of said extensions, and preparing a pair of legs and engaging first ends of said legs to said pins respectively so as to allow said legs to be rotated about said pins respectively and so as to allow said first ends of said legs to be engaged with said biasing means.

2. A method according to claim 1, wherein said legs each includes at least two curved depressions formed in said first end for engaging with said biasing means and for maintaining said legs at a working position and a folded position respectively.

\* \* \* \* \*